US006683132B1

(12) United States Patent
Schick et al.

(10) Patent No.: US 6,683,132 B1
(45) Date of Patent: Jan. 27, 2004

(54) SELF-CROSSLINKING AQUEOUS ACETOACETATE-FUNCTIONALIZED SULFONATED ALKYD SYSTEMS

(75) Inventors: Martin Frederick Schick, Kingsport, TN (US); Amy Lee Bolton, Greeneville, TN (US); Thauming Kuo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/324,722

(22) Filed: Dec. 19, 2002

(51) Int. Cl.$^7$ ............................................... C08F 283/01
(52) U.S. Cl. ........................ 524/601; 524/609; 524/764; 524/788; 524/847; 525/444.5; 525/153; 525/374; 525/379; 525/382; 528/272; 528/294; 528/295.5; 528/308
(58) Field of Search ................................. 524/601, 609, 524/764, 788, 847; 525/444.5, 153, 374, 379, 382; 528/272, 294, 295.5, 308

(56) References Cited

U.S. PATENT DOCUMENTS

| | | | |
|---|---|---|---|
| 3,734,874 A | 5/1973 | Kibler et al. | |
| 5,288,804 A | 2/1994 | Kim et al. | |
| 5,349,026 A | 9/1994 | Emmons et al. | |
| 5,371,148 A | 12/1994 | Taylor et al. | |
| 5,378,757 A | 1/1995 | Blount, Jr. et al. | |
| 5,484,849 A | 1/1996 | Bors et al. | |
| 5,498,659 A | 3/1996 | Esser | |
| 5,530,059 A | 6/1996 | Blount, Jr. et al. | |
| 6,262,149 B1 * | 7/2001 | Clark et al. | 523/501 |

OTHER PUBLICATIONS

J. Stewart Witzeman et al., "Comparison of Methods for the Preparation of Acetoacetylated Coating Resins", Oct., 1990, Journal of Coatings Technology.

F. Del Rector et al., "Applications for Acetoacetyl Chemistry in Thermoset Coatings", Apr., 1989, Journal of Coatings Technology.

L. J. Calbo, *Handbook of Coatings Additives*, pp. 496–506, Marcel Dekker, Inc,. New York, New York, 1987.

* cited by examiner

*Primary Examiner*—Peter D. Mulcahy
*Assistant Examiner*—Satya Sastri
(74) *Attorney, Agent, or Firm*—Michael K. Carrier; Bernard J. Graves, Jr.

(57) ABSTRACT

Self-crosslinking aqueous coating compositions are disclosed comprising a water-dispersible alkyd having both sulfonate and acetoacetate functionality, a suitable bi- or poly-functional primary amine, and a monofunctional primary or cycloaliphatic secondary amine. The crosslinking of the composition includes oxidative curing via the fatty acid segments of the alkyd, and crosslinking via reaction between the acetoacetate groups of the alkyd and the primary amine groups of the polyfunctional amine. The aqueous alkyd systems disclosed do not require the presence of amines for the purpose of dispersing the alkyds, while exhibiting superior tack-free and through-dry times when used in coating compositions. Performance levels are achieved that heretofore had required increases in molecular weight and Tg, with a concomitant increase in VOC levels. Also disclosed are methods of making the inventive compositions.

18 Claims, No Drawings

SELF-CROSSLINKING AQUEOUS ACETOACETATE-FUNCTIONALIZED SULFONATED ALKYD SYSTEMS

BACKGROUND OF THE INVENTION

1. Field of the Invention

The present invention relates to self-crosslinking aqueous coating compositions, and more particularly, to coating compositions that contain an acetoacetate-functionalized sulfonated alkyd, a cross-linking agent that includes at least two primary amine functionalities, and a monofunctional primary or a monofunctional cycloaliphatic secondary amine. The compositions according to the invention crosslink via oxidative crosslinking, as do conventional alkyd compositions, as well as via reaction between the acetoacetate functionality of the alkyd and the primary amines of the cross-linking agent. The water-dispersible, self-crosslinking alkyds of the present invention are particularly useful in or as coatings, adhesives, inks, primers, and overprint varnishes.

2. Description of Related Art

In recent years, considerable effort has been expended by the coatings industry to develop low or zero VOC (volatile organic compound) coating formulations. Regulations to limit the amount of VOC content of industrial coatings have encouraged research and development to explore new technologies directed at reducing solvent emissions from industrial solvent-based coatings operations such as automotive, appliance, general metal, furniture, and the like. One technology involves the replacement of organic solvents with water, and is of particular interest for the obvious reasons of availability, cost, and environmental acceptability. However, while the move from organic solvent-based compositions brings health and safety benefits, aqueous coating compositions must meet or exceed the performance standards expected from solvent-based compositions. The need to meet or exceed such performance standards places a premium on the characteristics and properties of waterborne polymer dispersions used in aqueous coating compositions.

Waterborne polymer dispersions have been prepared from each of the three primary industrial film-forming polymer types: polyesters, acrylics, and alkyds. Of the three polymer types, waterborne alkyd resins exhibit significantly higher coating stability than do waterborne polyester resins and waterborne acrylic resins. In addition, alkyd resins, due to their relatively low molecular weight, exhibit exceptional film-forming ability that translates into very high gloss in the final coating film. Resistance properties are developed, as with traditional solvent-borne alkyds, via oxidative crosslinking of the alkyd film. However, while known alkyd polymers have shown, and continue to show, promise, they have relatively slow "dry" and/or cure times, particularly at ambient temperatures. In an attempt to address such concerns, hybrids of waterborne alkyds and relatively high molecular weight acrylic polymers have received considerable attention. There remains a need, however, for a waterborne alkyd having improved crosslinking properties.

Also receiving much attention are amine-neutralized waterborne alkyds having free carboxyl groups, and thus a higher acid value. These alkyds unfortunately are susceptible to saponification from the neutralization used to disperse them in water, resulting in a loss of performance during storage. The pendant acid semiester moieties of these amine-neutralized waterborne alkyds are susceptible to hydrolysis as a result of the neutralization of the carboxyl groups necessary to effect dispersion of these alkyds in the aqueous carrier. The amine used to neutralize the waterborne alkyd tends to hydrolyze the ester bonds, as a result of the anchimeric effect. This results in a reduction in the pH of the system, with the potential for further loss of stability.

Scientists have attempted to eliminate this effect through careful raw material selection, in order to obtain more stable ester linkages.

Examples of such material selection are the inclusion of 1,4-cylcohexane dicarboxylic acid into the alkyd chain, in place of aromatic dicarboxylic acids, and the use of glycols having no hydrogen atoms bound to the carbon which is beta to the hydroxy group, and thus to the subsequent ester group. Such glycols include cyclohexane dimethanol, 2,2,4-trimethyl-1,3-pentane diol, trimethylolpropane, and neopentyl glycol. The use of polyethylene glycols as monomers in the alkyds to help disperse the polymer in water, thus lowering the level of carboxyl content necessary to produce a dispersion, has also been utilized. The hydrolysis exhibited has nonetheless ensured that, at best, amine-neutralized alkyds represent a short-term solution to the problem of providing waterborne coatings with the desired stability. There remains a need for waterborne alkyds that do not require neutralization for dispersion, and that exhibit improved crosslinking properties when compared to waterborne alkyds that cure solely via auto-oxidative crosslinking.

J. Stewart Witzeman et al., in an article entitled "Comparison of Methods for the Preparation of Acetoacetylated Coating Resins" in the October 1990 issue of *Journal of Coatings Technology*, outline various methods for the acetoacetylation of polyester and acrylic resins containing hydroxyl moieties. These examples are not directed toward alkyds or waterborne polyesters, nor indeed to any self-crosslinking systems.

F. Del Rector et al., in an article entitled "Applications for Acetoacetyl Chemistry in Thermoset Coatings" contained in the April 1989 issue of *Journal of Coatings Technology*, describe various means of crosslinking coatings containing acrylic or polyester resins having acetoacetyl moieties. Included in this discussion is the use of diamines as a crosslinker for such systems.

U.S. Pat. No. 5,288,804 (the '804 patent) discloses various types of polymers having at least two acetoacetate groups. The systems described require a crosslinking component having at least two groups which will react with an acetoacetate group, at least one of which is an aromatic aldimine group said to have a relatively low reactivity with water when compared with its reactivity with an acetoacetate group. Although an acetoacetate-functional alkyd is described in the '804 patent, the alkyd is solvent-based rather than water-dispersed, and does not appear to be suitable for dispersion into water, having an acid number prior to the acetoacetylation step of less than 10.

An alkyd that is otherwise similar to that described in the '804 patent, but having an acid number rendering it suitable for dispersion into water, would require a conventional neutralization step, in order to effect dissolution or dispersion. For example, the '804 patent teaches in Example 10 the use of a tertiary amine, triethylamine, to neutralize an acetoacetylated polyester having an acid value of 97.6. A major shortcoming of this neutralization technique is the saponification problems arising during storage from the carboxyl ions created during neutralization. The carboxyl ions, being in close proximity to the ester linkages of the alkyd backbone, accelerate the hydrolysis of the ester linkages, resulting in backbone cleavage via the anchimeric effect. The resulting carboxyl moieties released during hydrolysis decrease the pH of the system, thus resulting in an increased likelihood of further saponification. Clearly, a water-dispersible acetoacetate-functional alkyd not subject to such saponification problems would be a significant advance in the art.

U.S. Pat. No. 5,498,659 discloses a one-package aqueous polymeric formulation containing an aqueous carrier; a polymer having both acid-functional pendant moieties and acetoacetyl-functional pendant moieties; a "non-polymeric" (defined as less than about 2,000 g/mol) polyfunctional amine; and base. Alternatively, two or more separate polymers can be used, one of which has acid functionality, and one of which has acetoacetate functionality. The amount of base used is sufficient to inhibit the gellation which would otherwise occur as a result of crosslinking between the acetoacetate moieties of the polymer and the amine moieties of the polyfunctional amine. The polymers disclosed are acrylic in nature, and require neutralization to effect dispersion in water, with the attendant problems already discussed.

U.S. Pat. No. 5,484,849 discloses a self-crosslinking film-forming composition that includes a vinyl polymer containing pendant acetoacetate moieties, and an autooxidizable material. The autooxidizable material may be alkyd resins containing fatty acids.

U.S. Pat. No. 5,378,757 discloses a water-dissipatable alkyd resin having sulfonate functionality. The alkyd resin is prepared by reacting at least one monoglyceride, a polycarboxylic acid, and a polyol sulfomonomer adduct containing at least one sulfonate group. Neutralization of the sulfonated alkyd resin is not required to effect dispersion of the resin in water. The crosslinking exhibited by the resin is a result of auto-oxidative crosslinking typical of conventional alkyds.

U.S. Pat. No. 6,262,149 discloses a water-based latex of an acrylic-modified waterborne alkyd dispersion. The acrylic-modified alkyd is a hybrid resin prepared by the polymerization of ethylenically unsaturated monomers in the presence of a waterborne alkyd having at least one pendant sulfonate functionality. The ethylenically unsaturated monomers include monomers containing acetoacetyl moieties that have latent oxidative functionality.

Despite the several techniques already described by which aqueous coatings are obtained having more or less satisfactory coating properties, there remains a need in the art for a water-dispersible alkyd that exhibits coating properties typical of conventional solvent-based alkyds, that does not require neutralization for dispersion into an aqueous medium, and that exhibits both the auto-oxidative crosslinking of conventional alkyds, as well as a secondary crosslinking mechanism that can be separately controlled to suit the needs of the coatings formulator.

SUMMARY OF THE INVENTION

The present invention provides a novel, aqueous alkyd resin composition. More particularly, the invention provides a novel coating composition curable at ambient temperatures, the composition comprising a water-dispersible alkyd resin containing both sulfonate functionality and acetoacetate functionality; an amount of primary or cycloaliphatic secondary amine sufficient to convert at least a portion of the pendant acetoacetate groups in the aqueous composition to pendant enamine groups, in order to stabilize the composition during storage; and a cross-linking agent, preferably an aliphatic cross-linking agent, containing at least two primary amine functionalities capable of reacting with the acetoacetate functionality of the alkyd.

The invention also provides methods for preparing such water-dispersible alkyds, for example by the transesterification of the hydroxyl functionalities of a sulfonated, water-dispersible alkyd with an alkylacetoacetate.

The invention further provides novel coating compositions, which include the novel aqueous resin compositions of the invention.

DETAILED DESCRIPTION OF THE INVENTION

The invention provides a crosslinkable water-dispersible alkyd resin. In one embodiment, the alkyd resin provides a coating composition having a low VOC content while retaining good storage stability and good coating stability. The coating composition containing the water-dispersible alkyd resin of the present invention requires significantly less solvent; from less than 25 wt % to as low as 1 wt %, or even a zero VOC content. The water-dispersible alkyd of the present invention provides a coating composition that remains dispersible in the substantial absence of an organic solvent, retains the desirable properties of an alkyd, and produces coatings that have fast cure, and good acid and caustic resistance.

The acetoacetate-functional alkyds of the present invention may be obtained by reacting sulfonate-functional alkyds having hydroxyl functionality with either an alkylacetoacetate or diketene (acetyl ketene). Generally, sulfonated waterborne alkyd resins may be prepared by reacting a monobasic fatty acid, fatty ester, or naturally occurring, partially-saponified oil; a glycol or polyol; a polycarboxylic acid; and a sulfomonomer or sulfomonomer adduct containing at least one sulfomonomer group. Sulfonate-functional alkyds are described, for example, in U.S. Pat. Nos. 5,378,757 and 5,530,059, both of which are incorporated herein by reference.

The monobasic fatty acid, fatty ester, or naturally occurring, partially-saponified oil is preferably selected from the formulae (I), (II), and (III):

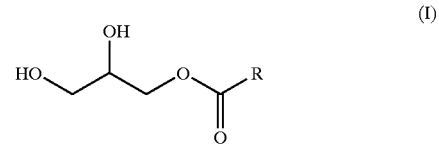

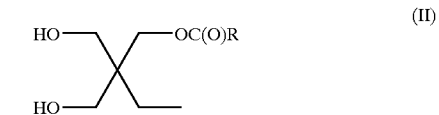

wherein the R group is a $C_8$–$C_{20}$ alkyl group. More preferably, the R group is one of the following:

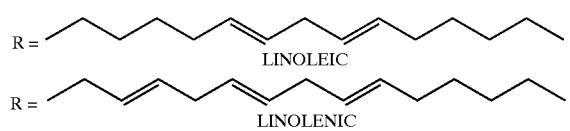

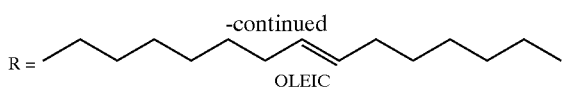
OLEIC

The monobasic fatty acid, fatty ester, or naturally occurring, partially-saponified oil is preferably prepared by reacting a fatty acid or oil with a polyol. Examples of suitable oils include, but are not limited to, sunflower oil, canola oil, dehydrated castor oil, coconut oil, corn oil, cottonseed oil, fish oil, linseed oil, oiticica oil, soya oil, and tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid, rosin acid, neodecanoic acid, neopentanoic acid, isostearic acid, 12-hydroxystearic acid, cottonseed acid, and the like.

The glycol or polyol is preferably selected from aliphatic, alicyclic, and aryl alkyl glycols. Suitable examples of glycols include, but are not limited to, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexane-dimethanol, 2,2,4-trimethyl-1,3-pentanediol, 2,2,4-tetramethyl-1,3-cyclobutane-diol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, glycerine, trimellitic anhydride, pyromellitic dianhydride, dimethylolpropiconic acid, and the like.

The polycarboxylic acid or anhydride is preferably selected from the group consisting of isophthalic acid, terephthalic acid, phthalic acid or anhydride, adipic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic acid or anhydride, 2,6-naphthalenedicarboxylic acid, glutaric acid, and esters thereof.

The sulfonated waterborne alkyd resins useful in the invention preferably have a K value, defined as the total number of moles ($M_t$) of each reactant divided by the total equivalents of acid functionality (Ea), of about 1.0 to about 1.5, or from about 1.0 to about 1.25, and an R value, defined as the total equivalents of hydroxyl functionality ($E_{OH}$) divided by the total equivalents of acid functionality ($E_a$), of about 1.0 to about 2.0, or from about 1.0 to about 1.5.

The K value is a measure of a resin's molecular weight, which increases as the K value decreases to 1.00. Since higher molecular weight resins are often preferred, K values that are closer to 1.00 are most preferred. The R value is proportional to the excess equivalents of hydroxyl functionality used in the resin synthesis. An excess of hydroxyl functionality is often preferred; however, this excess should not be so high as to render the resulting coating sensitive to water. Preferably, an R value of 1.0 to about 1.5 is selected, so as to minimize water sensitivity. However, since the excess hydroxyl functionalities of the inventive alkyd are acetoacetylated, the sensitivity of the resin to water due to excess hydroxyl functionality is effectively reduced.

The sulfomonomer of the sulfomonomer adduct is either a difunctional or a monofunctional monomer containing a —SO$_3$M group attached to an aromatic nucleus, where M is hydrogen or a metal ion such as, for example, Na$^+$, Li$^+$, K$^+$, Ca$^{2+}$, Cu$^{2+}$, Fe$^{2+}$, or Fe$^{3+}$. The sulfomonomer as a difunctional monomer component may be a dicarboxylic acid (or a derivative thereof) containing a —SO$_3$M group where M is as defined above. Suitable examples of the aromatic nucleus to which the —SO$_3$M group may be attached include, but are not limited to, benzene, naphthalene, anthracene, diphenyl, oxydiphenyl, sulfonyldiphenyl, and methylenediphenyl.

Especially good results are obtained when the difunctional monomer is a sodium salt of a sulfoisophthalic acid, a sulfoterephthalic acid, a sulfophthalic acid, a 4-sulfo-naphthalene-2,7-dicarboxylic acid, or derivatives thereof. More preferably, the difunctional monomer is 5-sodiosulfoisophthalic acid, or a derivative such as dimethyl 5-sodiosulfoisophthalate. Other preferred difunctional monomers are lithium 5-sulfoisophthalic acid, dimethyl lithium 5-sulfoisophthalate, potassium 5-sulfoisophthalic acid, and dimethyl potassium 5-sulfoisophthalate.

Other effective difunctional monomers containing a sulfonate (—SO$_3$M) group attached to an aromatic nucleus include metal salts of aromatic sulfonic acids or their respective esters of the formula (IV):

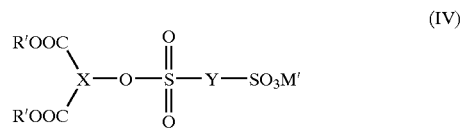

(IV)

wherein X is a trivalent aromatic hydrocarbon radical, Y is a divalent aromatic hydrocarbon radical, R' is hydrogen or an alkyl group of one to four carbon atoms, M' is hydrogen, Na$^+$, Li$^+$, or K$^+$. Examples of preferred monomers of formula (IV) include, but are not limited to, 4-sodiosulfophenyl-3,5-dicarbomethoxybenzenesulfonate, 4-lithiosulfophenyl-3,5-dicarbomethoxy-benzenesulfonate, and 6-sodiosulfo-2-naphthyl-3,5-dicarbomethoxy-benzenesulfonate.

Still other effective difunctional monomers containing a —SO$_3$M group attached to an aromatic nucleus include metal salts of sulfodiphenyl ether dicarboxylic acids or esters thereof of the formula (V):

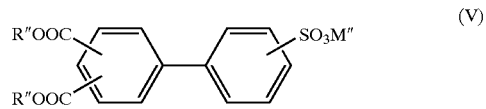

(V)

wherein R" is hydrogen, an alkyl group of one to eight carbon atoms, or phenyl, and M" is hydrogen, K$^+$, Na$^+$, or Li$^+$. Examples of preferred monomers include, but are not limited to, dimethyl 5-[4-(sodiosulfo)phenoxy]isophthalate, dimethyl 5-[4-(sodiosulfo)phenoxy]terephthalate, and 5-[4-(sodiosulfo)phenoxy]-isophthalic acid. Additional examples of such monomers are disclosed in U.S. Pat. No. 3,734,874, incorporated herein by reference.

The type and amount of metal sulfonate monomer used for water dispersibility can be varied to obtain useful ion-containing alkyd resins. As little as 2 mole percent based on total carboxylic acid content will impart a significant degree of water miscibility; however, at least 3 percent is preferred. Water-soluble polyesters can be formulated with as much as 20 mole percent of the metal sulfonate. However, a practical upper limit based on the amount of branch-inducing intermediate required to counteract the water sensitivity effects is 9 percent, preferably 6 percent.

Metal sulfonates that are most preferred include 5-sodiosulfoisophthalic acid, dimethyl 5-sodiosulfoisophthalate, lithium 5-sulfoisophthalic acid, dimethyl lithium 5-sulfoisophthalate, potassium 5-sulfoisophthalic acid, dimethyl potassium 5-sulfoisophthalate, 3-sodiosulfobenzoic acid, and the like.

Optionally, the sulfomonomer reacted with a polyol to produce a polyol (e.g. a diol) sulfomonomer adduct may be a monofunctional sulfomonomer containing at least one sulfonate group that may be reacted with a polyol containing at least three hydroxyl groups. The monofunctional sulfomonomer is preferably selected from the following group of sulfomonomers:

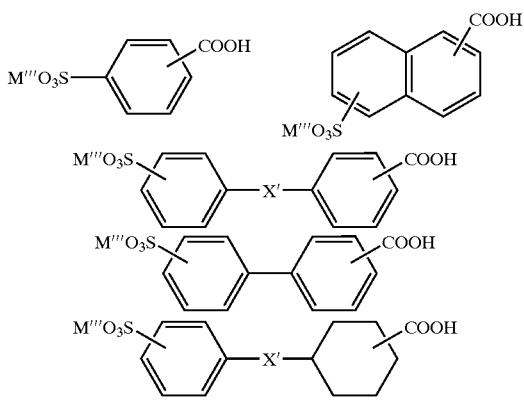

where X' is $CH_2$, $SO_2$, or O, and M''' is an alkaline or alkaline earth metal.

When the polyol sulfomonomer adduct is prepared by reacting a difunctional sulfomonomer with a polyol, the polyol is preferably a diol. Suitable examples of diols include those described above, with the following diols being more preferred: ethylene glycol, diethylene glycol, 2,2,4-trimethyl-1,3-pentanediol, 1,4-cyclohexanedimethanol, 1,3-cyclohexanedimethanol, hydroxypivalyl hydroxypivalate, dipropylene glycol, 1,6-hexanediol, 1,10-decanediol, 1,3-butanediol, hydrogenated bisphenol A, 1,4-butanediol, and neopentyl glycol.

In addition to the polyol reacted with the fatty acid, fatty ester or naturally occurring, partially-saponified oil according to the preferred step, and in addition to the polyol used in the preparation of the sulfomonomer adduct from a monofunctional sulfomonomer, an additional amount of a polyol or other branching agent such as a polycarboxylic acid may be used to increase the molecular weight and branching of the waterborne alkyd resin. These branching agents are preferably selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

The sulfonated alkyd according to the invention may thus comprise a water-dispersible alkyd resin made of moieties of the reaction products:
(a) about 30 to 80 weight percent of a monobasic fatty acid, fatty ester, or naturally occurring, partially-saponified oil,
(b) about 10 to 40 weight percent of a glycol or polyol,
(c) about 10 to 40 weight percent of a polycarboxylic acid, and
(d) from a minor amount up to about 10 weight percent of a sulfomonomer or sulfomonomer adduct containing at least one sulfomonomer group, wherein the weight percent of the sulfomonomer or adduct is based on the weight of sulfomonomer or sulfomonomer group, wherein, when the weight percentages of (a) through (d) are converted to their respective moles and equivalents, the total number of moles, $M_t$, divided by the total equivalents of acid functionality, $E_a$, is preferably between 1.0 and 1.5 (K value); and the total equivalents of hydroxyl functionality, $E_{OH}$, divided by the total equivalents of acid functionality, $E_a$, is preferably between 1.0 and 2.0 (R value).

The alkyds of this invention may be styrenated (free-radical graft polymerized with styrene monomer), acrylated (free-radical graft polymerized with various acrylate monomers, preferably methyl methacrylate), chain-stopped (chain terminated with benzoic acid or other aromatic monobasic acids), or otherwise modified as is known to those skilled in the art of alkyd resins, in order to modify the application and performance properties of the alkyds.

The acetoacetylation of the alkyd resin may be accomplished by treatment with diketene (acetyl ketene); by a thermal reaction with 2,2,6-trimethyl-4H-1,3-dioxin-4-one; or by transesterification with an alkylacetoacetate. Examples of suitable alkylacetoacetates include, but are not limited to, methyl acetoacetate, ethyl acetoacetate, isobutyl acetoacetate, isopropyl acetoacetate, and diisopropyl carbinol acetoacetate. Preferred is the use of t-amyl acetoacetate or t-butyl acetoacetate.

The rate of the acetoacetylation reaction may be enhanced by the addition of a catalyst. Examples of such catalysts include, but are not limited to, dimethylaminopyridine, tetramethylguanidine, and metal catalysts such as titanium isopropoxide or dibutyltin dilaurate.

The described acetoacetylation can be carried out on the sulfonated alkyds of the invention either directly, or in the presence of a solvent. Solvents useful for conducting the transacetoacetylation are those that contain no functionalities that would react with the acetoacetylating agent. Such solvents include aromatic solvents, aliphatic solvents, esters, ketones, and ethers. Examples of aromatic solvents include, but are not limited to, toluene or xylene. Examples of aliphatic solvents include, but are not limited to, hexane.

Examples of ester solvents include, but are not limited to, methyl acetate, ethyl acetate, isopropyl acetate, propyl acetate, isobutyl acetate, butyl acetate, methyl amyl acetate, amyl acetate, isobutyl isobutyrate, 2-ethoxyethyl acetate, 2-butoxyethyl acetate, 2-ethylhexyl acetate, ethylene glycol diacetate, 2-(2-ethoxyethoxy)ethyl acetate and 2-(2-butoxyethoxy)ethyl acetate. Examples of ketone solvents include, but are not limited to, methyl ethyl ketone, acetone, methyl propyl ketone, methyl isobutyl ketone, methyl isoamyl ketone, methyl amyl ketone, cyclohexanone, and diisobutyl ketone.

Examples of ethers include, but are not limited to, tertrahydrofuran, propylene glycol dimethyl ether, di(propylene glycol) dimethyl ether, and di(propylene glycol) dibenzoate.

As noted above, crosslinking occurs when the acetoacetoxy-functional moieties react with the primary amines of the cross-linking agent. As was also noted, the novel water-based polymeric compositions and formulations of the invention include an effective amount of an amine, preferably a primary amine or a cycloaliphatic secondary amine, to inhibit premature reaction between the acetoacetoxy-functional pendant moieties of the alkyd and the amine-functional moieties of the crosslinking agent, which would otherwise result in gellation.

Further, aqueous polymers containing pendant acetoacetate functionality are prone to hydrolysis in water, particularly on heat aging. The hydrolysis occurs at nearly any pH, yielding acetoacetic acid, which in turn decomposes to acetone and carbon dioxide.

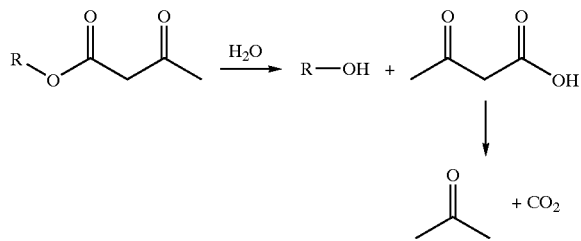

where R is the backbone of the alkyd resin.

After dispersing the alkyd of the present invention in water, and optionally neutralizing any residual acidity of the dispersion, this problem of hydrolysis may be eliminated by treating the aqueous acetoacetate polymer with one molar equivalent of ammonia or a primary amine such as ethanolamine, methyl amine, or isopropyl amine. Cycloaliphatic secondary amines, such as morpholine, piperidine or pyrrolidine, may also be employed. Typically, the polymer is first adjusted to a basic pH, preferably to a pH greater than 9, before adding the one molar equivalent of amine for enamine formation. Under these conditions the enamine is formed. Although it would be acceptable to adjust the pH of the system to only about 7.0, raising the pH to 9.0 insures the formation of the enamine as well as improving the compatibility of the system with the additives normally used in coatings at higher pH. The reaction to form the enamine is generally rapid, with the rate of formation increasing with temperature. In general, enamine formation is substantially complete within 24 hours, although in practice the enamine is rapidly formed. An alternative approach is to raise the pH to about 9, allow the system to equilibrate, and readjust the pH to about 9 to replace the amine consumed by enamine formation.

The enamine formed is then stable to hydrolysis.

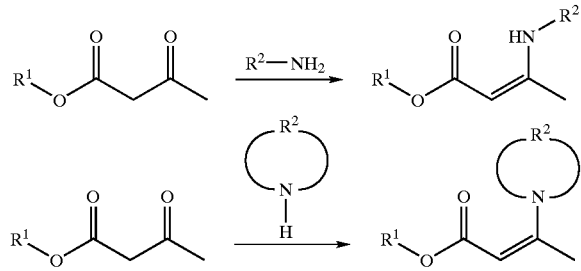

$R^1$ is the backbone of the alkyd resin, and $R^2$ is the residue of the primary or cylcoaliphatic secondary amine.

The amount of ammonia or amine used should be at least equivalent to the amount of acetoacetate in the polymer. Sterically hindered primary amines such as t-butyl amine, and aromatic amines such as aniline, are less suitable, because of incomplete enamine formation. The enamine formation is a reversible reaction, so that as the ammonia or amine evaporates after film formation and exposure to ambient air, the pendant acetoacetate is regenerated in the film. The wet composition is quite storage stable, however, so long as it is stored under conditions (such as a closed container) where the amine/ammonia cannot evaporate. Indeed, the desirable crosslinking reaction, as between these mutually reactive moieties, does not fully occur until after evaporation of the volatile components of the novel aqueous polymeric formulation upon application to a substrate.

The primary amine is thus added to the formulation for the purpose of stabilizing the acetoacetate group, through the reversible formation of the enamine. Because the inventive formulation relies on the sulfonate functionality to enable aqueous dispersion, the acid value of the inventive formulation is below the level necessary to enable its aqueous dispersion upon neutralization. As a result, the amount of free amine present is much less than when an amine is provided for the purpose of neutralizing a high acid number alkyd, to enable its aqueous dispersion. Consequently, the tendency of the inventive formulation toward saponification is substantially reduced.

Furthermore, though ammonia or an amine are advantageously added to the compositions of the claimed invention, the acetoacetoxy-functional alkyds of the present invention do not require neutralization for dispersing in water. Thus, the previously mentioned pH adjustment and enamine formation may occur prior to employing the acetoacetoxy-functional alkyd in a fully formulated coating composition, or subsequent to the generation of a coating composition. However, it is desirable to provide enamine formation to the acetoacetoxy-functional alkyd prior to use in a coating composition, to avoid possible interactions of the reactive acetoacetoxy moieties of the polymer with components of the coating recipe. Regardless, the neutralization step used in conventional carboxyl-functional alkyds is unnecessary according to the present invention.

Subsequent to the enamine formation of the acetoacetoxy-functional alkyd, a predetermined amount of the above-mentioned polyfunctional amine having at least two amine-functional moieties may be introduced into the agitated reactor contents, typically over a time period of 5 to 15 minutes or longer. The polyfunctional amine, upon being added to the reactor contents, may dissolve in the continuous phase of the alkyd, or may become distributed between the continuous and dispersed phases.

Sufficient polyfunctional amine is thus incorporated into the reactor contents so as to cause the polymeric composition therein to typically contain about 0.5 to 1.5 acetoacetoxy-type functional pendant moieties per amine-functional moiety. Surprisingly, the polymeric composition thus produced is quite stable when stored at room temperature.

Optionally, the above-mentioned polyfunctional amine may be introduced during the manufacturing of the coating composition or prior to the application of the coating.

The polyfunctional amine-containing compound (possessing at least two amine-functional moieties) typically has a chemical-formula weight of less than about 2,000 grams per mole, and preferably has a chemical-formula weight of less than about 1,000 grams per mole, although in some instances a higher molecular weight polymeric polyfunctional amine may be advantageous. Accordingly, polyfunctional amines suitable for purposes of the present invention include those aliphatic and cycloaliphatic amines having from 2 to 10 primary and/or secondary amino groups, and from 2 to 100 carbon atoms.

Suitable non-polymeric polyfunctional amines include, but are not limited to, hexamethylene diamine ("HMDA"); 2-methyl pentamethylene diamine; 1,3-diamino pentane; dodecane diamine; 1,2-diamino cyclohexane; 1,4-diamino cyclohexane; para-phenylene diamine; isophorone diamine; bis-hexamethylene trimine; diethylene triamine ("DETA"); and combinations thereof. Suitable polymeric polyfunctional amines include, but are not limited to, polyamines, polyethylenimine, and polyallylamine.

Other polyfunctional amines that are suitable include those containing adducts of ethylene and propylene oxide, such as the "JEFFAMINE" series of "D", "ED", "T" and "XTJ" available from Huntsman Chemical Corporation, Salt Lake City, Utah.

Preferred polyfunctional amines include those having from 2 to 4 primary amino groups and from 2 to 20 carbon atoms.

Particularly preferred polyfunctional amines include hexamethylene diamine ("HMDA"), diethylene triamine ("DETA"), and combinations thereof.

Prior to use, the inventive crosslinkable aqueous polymeric formulation can be stored at room temperature in a conventional container such as a metal can, a squeezable plastic tube, a glass bottle, an aerosol container, and so forth. When use is desired, the crosslinkable aqueous polymeric formulation is applied to a suitable substrate. Evaporation of the evaporable components of the aqueous coating then occurs over a predetermined period of time, which is typically governed by ambient conditions. Such evaporation enables desirable crosslinking to take place as between the above-discussed mutually reactive moieties. A crosslinked polymeric surface coating is thus observed to form on the substrate, in due course.

In common with conventional alkyd formulations, the resistance properties of the alkyd resins according to the invention are developed, in part, via auto-oxidative crosslinking of the alkyd film. This auto-oxidative crosslinking occurs when the activated methylene groups in the unsaturated fatty acids or oils of the alkyd are oxidized in air to give hydroperoxides, which subsequently decompose to generate free radicals for various crosslinking mechanisms. This oxidative crosslinking process is commonly accelerated by adding driers such as, for example, various salts of cobalt, lead, manganese, iron, zinc, calcium, cerium, vanadium, barium, zirconium, aluminum, and combinations thereof. Preferably, the drier includes a cobalt drier. Mixtures of driers, i.e. a drier system, may also be used. The driers typically are used as octoates or naphthenates, in an amount of from 0.005–0.5 wt. % metal, based on the alkyd resin. Examples of commercial products are Zirconium HEX-CEM, Cobalt TEN-CEM, Calcium CEM-ALL, Zirconium HYDRO-CEM, and Cobalt HYDRO-CURE II, all sold by OMG Americas of Westlake, Ohio. A description of metal driers, their functions, and methods for using them may be found in *Handbook of Coatings Additives*, p. 496–506, ed. by L. J. Calbo, Marcel Dekker, INC. New York, N.Y., 1987, incorporated by reference herein in its entirety.

Although the invention. encompasses the use of conventional amounts of metal driers, the improved crosslinking exhibited according to the claimed invention suggests that lower amounts of driers may be used than are required in conventional auto-oxidative crosslinking alkyds. Further, the improved tack-free time of the inventive compositions suggests that lower amounts of surface driers may be required than are typically used in conventional alkyd formulations. Indeed, in certain applications, it may not be necessary to provide a metal drier in order to accelerate the auto-oxidative crosslinking of the inventive alkyds. The claimed invention thus is intended to encompass formulations having little or substantially no metal drier added.

The coating composition may be coated onto a substrate and cured using techniques known in the art (e.g., by spray-applying 3 to 4 mils of wet coating onto a metal panel, and heating in a 150° C. forced air oven for 30 minutes). The substrate can be any common substrate such as paper, polyester films such as polyethylene and polypropylene, metals such as aluminum and steel, glass, urethane elastomers, primed (painted) substrates, and the like. The coating composition of the invention may be cured at room temperature (ambient cure) or at elevated temperatures (thermal cure), or may be cured photochemically.

A coating composition of the invention may further contain coating additives. Examples of such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include, but are not limited to, synthetic silica, available from the Davison Chemical Division of W.R. Grace & Company under the SYLOID™ tradename; polypropylene, available from Hercules Inc. under the HERCOFLAT™ tradename; and synthetic silicate, available from J.M. Huber Corporation under the ZEOLEX™ tradename.

Examples of dispersing agents and surfactants include, but are not limited to, sodium bis(tridecyl) sulfosuccinate, di(2-ethylhexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the ANTI TERRA™ tradename. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, hydroxypropyl methyl cellulose, ethyl hydroxyethyl cellulose, polyethylene oxide, guar gum and the like. Other examples of thickeners include the methylene/ethylene oxide associative thickeners and water-soluble carboxylated thickeners such as, for example, UCAR POLYPHOBE™ by Union Carbide.

Several proprietary antifoaming agents are commercially available and include, for example, BUBREAK™ of Buckman Laboratories Inc., BYK™ (of BYK Chemie, U.S.A., FOAMASTER™ and NOPCO™ of Henkel Corp./Coating Chemicals, DREWPLUS™ of the Drew Industrial Division of Ashland Chemical Company, TRYSOL™ and TROYKYD™ of Troy Chemical Corporation, and SAG™ of Union Carbide Corporation.

Examples of fungicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-(thiocyano-methylthio)benzothiazole, potassium dimethyl dithiocarbamate, adamantane, N-(trichloromethylthio) phthalimide, 2,4,5,6-tetrachloro-isophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include, among others, substituted benzophenone, substituted benzotriazoles, hindered amines, and hindered benzoates, available from American Cyanamid Company under the CYASORB UV™ tradename, and diethyl-3-acetyl-4-hydroxy-benzyl-phosphonate, 4-dodecyloxy-2-hydroxy benzophenone, and resorcinol monobenzoate.

Examples of solvents and coalescing agents are well known, and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, TEXANOL™ ester alcohol (Eastman Chemical Company), and the like. Such solvents and coalescing aids may also include reactive solvents and coalescing aids such as diallyl phthalate, SANTOLINK XI-100™ (polyglycidyl allyl ether from Monsanto), and others as described in U.S. Pat. Nos. 5,349,026 and 5,371,148, incorporated herein by reference.

Pigments or pigment dispersions suitable for use in the coating compositions envisioned by the invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to, the following: titanium dioxide, barytes, clay, or calcium carbonate, Cl Pigment White 6 (titanium dioxide); Cl Pigment Rea 101 (red iron oxide); Cl Pigment Yellow 42; Cl Pigment Blue 15, 15:1,15:2, 15:3,15:4 (copper phthalocyanines); Cl Pigment Red, 49:1; and Cl Pigment Red 57:1. Colorants such as phthalocyanine blue, molybdate orange, or carbon black are also suitable for the coating compositions of the invention.

EXAMPLES

1. Preparation of an NPG/SIP Adduct

To a 1 L four-neck reaction flask equipped with a mechanical stirrer, a steam-jacketed partial condenser, a Dean-Stark trap, a water condenser, and a nitrogen spurge were charged neopentyl glycol (NPG) (582.5 g, 5.59 moles), 5-SSIPA (352.0 g, 1.31 moles), Fastcat 4100 catalyst (0.8 g), and water (64.7 g). The reaction mixture was stirred at 100° C. for 30 min. and then at 125° C. for 1 hour; the distillate was collected in the Dean-Stark trap. The reaction was allowed to continue at 140° C. for 1 hr., at 160° C. for 1 hr., at 175° C. for 2 hrs., and at 190° C. for 5 hrs.; a total of 117.3 g of distillate was collected. The final acid number obtained was 3.2 mg KOH/g of sample. The resulting adduct was cooled to 120° C. and isolated neat.

2. Preparation of Acetoacetate-Functional Alkyd Resin 1

To a 1 L four-neck reaction flask equipped with a mechanical stirrer, a steam-jacketed partial condenser, a Dean-Stark trap, a water condenser, and a nitrogen spurge were charged NPG/SIP adduct of Example 1 (72.7 g), pentaerythritol (114.8 g, 0.84 mole), phthalic acid (130.0 g, 0.78 mole), Pamolyn 200 linoleic acid (392.6 g, 1.40 mole), and Fastcat 4100 catalyst (0.8 g). The reaction mixture was heated with stirring to 130° C. and held for 1.5 hrs.; the distillate was collected in the Dean-Stark trap. The reaction was allowed to continue at 180° C. for 1.5 hrs., at 210° C. for 1.5 hrs., and at 230° C. for 1.5 hrs.; a total of 46.7 g of distillate was collected. The acid number of the resin was 11.5 mg KOH/g and the hydroxyl number was 101.1 mg KOH/g of sample (1.81 mmol of hydroxyl per gram of polymer). The mixture was allowed to cool to 140° C. T-butyl acetoacetate (158.0 g, 1.00 mole, 1.51 mmol per gram of polymer) was added to the reaction mixture via an addition funnel over a 30 min. period; a total of 51.5 g of distillate were collected in the Dean-Stark trap. The reaction was allowed to continue at 140° C. for 1.5 hrs. The resulting mixture was allowed to cool to 70° C. and iso-propanol (200.0 g) was added to the reaction mixture via an addition funnel and blended with the mixture with stirring. The resulting resin was collected for later testing.

3. Preparation of Acetoacetate-Functional Alkyd Resin 2

To a 1 L four-neck reaction flask equipped with a mechanical stirrer, a steam-jacketed partial condenser, a Dean-Stark trap, a water condenser, and a nitrogen spurge were charged trimethylolpropane (TMP) (148.2 g, 1.10 mole), the NPG/SIP adduct of Example 1 (87.4 g), isophthalic acid (193.1 g, 1.16 mole), Pamolyn 200 linoleic acid (222.3 g, 0.79 mole), and Fastcat 4100; catalyst (0.8 g). The reaction mixture was stirred at 150° C. for 1 hr, and then at 190° C. for 1 hr; the distillate was collected in the Dean-Stark trap. The reaction was allowed to continue at 210° C. for 1.5 hrs., and at 230° C. for 1.5 hrs.; a total of 43.4 g of distillate was collected. The acid number of the reaction mixture was 9.9 mg KOH/g and the hydroxyl number was 94.6 mg KOH/g of sample (1.69 mmol of hydroxyl per gram of polymer). The mixture was allowed to cool to 140° C. Di(propylene glycol) dimethyl ether (200.0 g) was added to the reaction mixture slowly via an addition funnel and stirred into the mixture. While at 140° C., T-butyl acetoacetate (158.0 g, 1.00 mole, 1.64 mmol per gram of polymer) was added to the reaction mixture via an addition funnel over a 30 min. period; a total of 63.5 g of distillate were collected in the Dean-Stark trap. The reaction was allowed to continue at 140° C. for 1.5 hrs. The resulting mixture was allowed to cool to 100° C. and the resulting resin was collected for later testing.

4. Preparation of a TMP/SIP Adduct

To a 1 L four-neck reaction flask equipped With a mechanical stirrer, a steam-jacketed partial condenser, a Dean-Stark trap, a water condenser, and a nitrogen spurge were charged trimethylolpropane (TMP) (718.9 g, 5.36 moles), 5-SSIPA (280.4 g, 1.05 moles), and Fastcat 4100 catalyst (0.8 g). The reaction mixture was stirred at 100° C. for 1 hr. and then at 125° C. for 30 min.; the distillate was collected in the Dean-Stark trap. The reaction was allowed to continue at 150° C. for 30 min., at 180° C. for 1 hr., and at 190° C. for 5 hrs.; a total of 44.7 g of distillate was collected. The final acid number obtained was 1.7 mg KOH/g of sample. The resulting adduct was cooled to 120° C. and isolated neat.

5. Preparation of Acetoacetate-Functional Alkyd Resin 3

To a 1 L four-neck reaction flask equipped with a mechanical stirrer, a steam-jacketed partial condenser, a Dean-Stark trap, a water condenser, and a nitrogen spurge were charged the TMP/SIP adduct of Example 4 (183.0 g), pentaerythritol (104.3 g, 0.77 mole), phthalic acid (194.3, 1.17 mole), benzoic acid (40.5 g, 0.33 mole), Pamolyn 200 linoleic acid (457.5 g, 1.63 mole), and Fastcat 4100 catalyst (1.0 g). The reaction mixture was stirred at 125° C. for 1 hr., and then at 150° C. for 1 hr; the distillate was collected in the Dean-Stark trap.

The reaction was allowed to continue at 190° C. for 1.5 hrs., then at 210° C. for 1 hr., and at 230° C. for 2.5 hrs.; a total of 62.0 g of distillate was collected. The acid number of the reaction mixture was 17.2 mg KOH/g and the hydroxyl number was 86.3 mg KOH/g of sample (1.54 mmol of hydroxyl per gram of polymer). The mixture was allowed to cool to 140° C. T-butyl acetoacetate (211.3 g, 1.33 mole, 1.45 mmol per gram of polymer) was added to the reaction mixture via an addition funnel over a 30 min. period; a total of 76.0 g of distillate were collected in the Dean-Stark trap. The reaction was allowed to continue at 140° C. for 1.5 hrs. The resulting mixture was allowed to cool to 100° C. and 2-butanol (193.0 g) was added to the reaction mixture via an addition funnel and blended with the mixture with stirring. The resulting resin was collected for later testing.

6. Preparation of Comparative Alkyd Resin 1

To a 1 L four-neck reaction flask equipped with a mechanical stirrer, a steam-jacketed partial condenser, a Dean-Stark trap, a water condenser, and a nitrogen spurge were charged the NPG/SIP adduct of Example 1 (81.9 g), pentaerythritol (129.3 g, 0.95 mole), phthalic acid (146.5 g, 0.88 mole), Pamolyn 200 linoleic acid (442.3 g, 1.58 mole) and Fastcat 4100 catalyst (0.8 g). The reaction mixture was heated with stirring to 130° C. and held for 1.5 hrs.; the distillate was collected in the Dean-Stark trap. The reaction was allowed to continue at 180° C. for 1 hr., at 190° C. for 1 hr., at 200° C. for 1 hr., at 210° C. for 3.5 hrs., and at 230° C. for 1 hr.; a total of 53.1 g of distillate was collected. The acid number of the resin was 10.8 mg KOH/g and the hydroxyl number was 98.3 mg KOH/g of sample. The resulting mixture was allowed to cool to 70° C. and isopropanol (200.0 g) was added to the reaction mixture via an addition funnel and blended with the mixture with stirring. The resulting resin was collected for later testing.

7. Preparation of Comparative Alkyd Resin 2

To a 1 L four-neck reaction flask equipped with a mechanical stirrer, a steam-jacketed partial condenser, a Dean-Stark trap, a water condenser, and a nitrogen spurge were charged trimethylolpropane (TMP) (182.4 g, 1.36 mole), the NPG/SIP adduct of Example 1 (107.6 g), isophthalic acid (237.6 g, 1.43 mole), Pamolyn 200 linoleic acid (273.6 g, 0.98 mole), and Fastcat 4100 catalyst (0.8 g). The reaction mixture was stirred at 150° C. for 1 hr, and then at 190° C. for 1 hr; the distillate was collected in the Dean-Stark trap. The reaction was allowed to continue at 210° C. for 2 hrs., and at 230° C. for 1.5 hrs.; a total of 60.1 g of distillate was collected. The acid number of the reaction mixture was 7.6 mg KOH/g and the hydroxyl number was 89.7 mg KOH/g of sample. The resulting mixture was allowed to cool to 150° C. and propylene glycol propyl ether (200.0 g) was added to the reaction mixture via an addition funnel and blended with the mixture with stirring. The resulting resin was collected for later testing.

8. Preparation of Comparative Alkyd Resin 3

To a 1 L four-neck reaction flask equipped with a mechanical stirrer, a steam-jacketed partial condenser, a Dean-Stark trap, a water condenser, and a nitrogen spurge were charged the TMP/SIP adduct of Example 4 (205.3 g), pentaerythritol (117.0 g, 0.86 mole), phthalic acid (217.9, 1.31 mole), benzoic acid (45.4 g, 0.37 mole), Pamolyn 200 linoleic acid (513.2 g, 1.83 mole), and Fastcat 4100 catalyst (1.0 g). The reaction mixture was stirred at 125° C. for 1 hr., and then at 150° C. for 30 mins.; the distillate was collected in the Dean-Stark trap. The reaction was allowed to continue at 180° C. for 2.5 hrs., then at 200° C. for 1.5 hr., at 220° C. for 1.5 hrs., and at 230° C. for 2 hrs.; a total of 63.9 g of distillate was collected. The acid number of the reaction mixture was 11.4 mg KOH/g and the hydroxyl number was 90.0 mg KOH/g of sample. The resulting mixture was allowed to cool to 100° C. and 2-butanol (193.0 g) was added to the reaction mixture via an addition funnel and blended with the mixture with stirring. The resulting resin was collected for later testing.

9–11. Preparation of Acetoacetate-Functional Alkyd Paints 1 Through 3

Samples of acetoacetate-functional alkyd resins 1 through 3 (Examples 2, 3 and 5) were diluted with water and low levels of ammonium hydroxide (28%) according to the following table with the pH being adjusted to between 8.5 and 9.0. The level of hexamethylene diamine (HMDA, 25% in water) was calculated such that there was one half mole of HMDA to every mole of acetoacetate functionality in the final formulation. The HMDA solution was not added to the paint until the last step. The diluted mixtures were used in generating white paints.

| Ex. No. | Alkyd Ex. No. | Alkyd Solids, % | AcAc, mmol/g alkyd | Alkyd, grams | $H_2O$ & $NH_4OH$, grams | HMDA (25%), grams |
| --- | --- | --- | --- | --- | --- | --- |
| 9 | 2 | 71.5 | 1.03 | 356.8 | 284.7 | 85.3 |
| 10 | 3 | 74.8 | 1.11 | 341.2 | 297.9 | 87.7 |
| 11 | 5 | 79.0 | 1.08 | 322.6 | 323.6 | 80.7 |

In a 1.5 L Cowles disperser was charged the diluted acetoacetate-functional resin 1, 2 or 3 (181.6 g), BYK-156 dispersant (5.1 g), and BYK-024 defoamer (1.8 g). The mixture was stirred under mild shear. Then under agitation, TiPure R-900 titanium oxide (255.0 g) was added slowly. The millbase was ground to a 7+ Hegman grind and reduced with additional diluted acetoacetate-functional alkyd resin (72.7 g). The paste was letdown with the addition of the diluted acetoacetate-functional alkyd resin (472.5 g) and a premixed solution of ethylene glycol butyl ether coalescent (30.6 g), Hydrocure II 5% cobalt catalyst (5.1 g), Hydro Cem 12% zirconium catalyst (10.2 g) and BYK-024 defoamer (3.6 g). The quantity of 25% hexamethylene diamine listed in the above table was added to the paints and the paints were mixed. The paints were then used for testing.

12–14. Preparation of Comparative Alkyd Paints 4 Through 6

Samples of comparative alkyd resins 1 through 3 (Examples 6 through 8) were diluted with water and low levels of ammonium hydroxide (28%) to 35.1 non-volatile weight percent and pH between 8.5 and 9.0. The diluted mixtures were used in generating white paints.

| Ex. No. | Alkyd Ex. No. | Alkyd Solids, % | Alkyd, grams | $H_2O$ & $NH_4OH$, grams |
|---|---|---|---|---|
| 12 | 6 | 78.3 | 325.8 | 401.0 |
| 13 | 7 | 82.8 | 308.1 | 418.7 |
| 14 | 8 | 82.9 | 307.7 | 419.1 |

In a 1.5 L Cowles disperser was charged the diluted comparative alkyd resin 1, 2 or 3 (181.6 g), BYK-156 dispersant (5.1 g), and BYK-024 defoamer (1.8 g). The mixture was stirred under mild shear. Then under agitation, TiPure R-900 titanium oxide (255.0 g) was added slowly. The millbase was ground to a 7+ Hegman grind and reduced with additional diluted comparative alkyd resin (72.7 g). The paste was letdown with the addition of the diluted comparative alkyd resin (472.5 g) and a premixed solution of ethylene glycol butyl ether coalescent (30.6 g), Hydrocure II 5% cobalt catalyst (5.1 g), Hydro Cem 12% zirconium catalyst (10.2 g) and BYK-024 defoamer (3.6 g). The paints were mixed well under moderate agitation and retained for testing.

15–20. Drying Rates of Comparative Paints Versus Reactive Paints

Reactive paints from Examples 9 through 11 and comparative paints from Examples 12 through 14 were applied to glass panels using a 3.0 mil Bird applicator. The panels were tested for drying rates in a 50% relative humidity, 72° F. room.

| Ex. No. | Paint Ex. No. | Paint Solids, % | Tack Free Time, hrs | Dry Through Time, hrs |
|---|---|---|---|---|
| 15 | 9 | 55.0 | ¾ | 7 |
| 16 | 10 | 50.3 | ½ | 2 |
| 17 | 11 | 50.8 | ¾ | 7 |
| 18 | 12 | 49.9 | 12 | >12 |
| 19 | 13 | 50.4 | 12 | >12 |
| 20 | 14 | 50.7 | 11 | 12 |

21–26. Evaluation of Comparative Paints Versus Reactive Paints

Reactive (inventive) paints from Examples 9 through 11 and comparative paints from Examples 12 through 14 were applied to glass plates and metal panels (chromate pretreated aluminum) using a 3.0 mil Bird applicator. The plates and panels were allowed to dry at room temperature for 24 hours prior to testing.

| Ex. No. | Paint Ex. No. | Paint Solids, % | Dry Film, mil | Gloss, 60° | Double Rubs, acetone | Hardness, Sward |
|---|---|---|---|---|---|---|
| 21 | 9 | 55.0 | 2.15 | 6.3 | 23 | 2.0 |
| 22 | 10 | 50.3 | 1.59 | 11.3 | 53 | 4.0 |
| 23 | 11 | 50.8 | 1.57 | 33.4 | 25 | 3.0 |
| 24 | 12 | 49.9 | 1.51 | 27.5 | 19 | 1.5 |
| 25 | 13 | 50.4 | 1 03 | 86.2 | 4 | 2.5 |
| 26 | 14 | 50.7 | 1.57 | 84.0 | 32 | 2.0 |

After 1 week at room temperature, the panels were again tested.

| Ex. No. | Paint Ex. No. | Gloss, 60° | Double Rubs, acetone | Hardness, Sward | Pencil Hardness |
|---|---|---|---|---|---|
| 21 | 9 | 5.3 | 118 | 3.0 | HB |
| 22 | 10 | 10.4 | 300+ | 6.0 | B |
| 23 | 11 | 31.6 | 236 | 5.0 | B |
| 24 | 12 | 20.2 | 155 | 2.5 | 2B |
| 25 | 13 | 78.0 | 12 | 4.5 | 2B |
| 26 | 14 | 71.6 | 178 | 3.0 | 2B |

27–30. Preparation of Acetoacetate-Functional Alkyd Paints 7 Through 10

Samples of acetoacetate-functional alkyd resin 2 (Example 3) were diluted with water and low levels of ammonium hydroxide (28%) according to the following table with the pH being adjusted to between 8.5 and 9.0. The levels of hexamethylene diamine (HMDA, 25% in water) necessary to react with 25%, 50%, 75% and 100% of the acetoacetate functionalities present in the alkyd were calculated, but were not added to the paint until the last step. The diluted mixtures were used in generating white paints based on the formulation listed in Examples 9–11.

| Ex. No. | Alkyd Ex. No. | Alkyd Solids, % | AcAc, mmol/g alkyd | Alkyd, grams | $H_2O$ & $NH_4OH$, grams | HMDA (25%), g |
|---|---|---|---|---|---|---|
| 27 | 3 | 74.8 | 1.11 | 341.2 | 363.7 | 21.9 |
| 28 | 3 | 74.8 | 1.11 | 341.2 | 341.7 | 43.9 |
| 29 | 3 | 74.8 | 1.11 | 341.2 | 319.8 | 65.8 |
| 30 | 3 | 74.8 | 1.11 | 341.2 | 297.9 | 87.7 |

31–34. Drying Rates of Reactive Paints with Varying Levels of Crosslinker

Reactive (inventive) paints from Examples 27 through 30 were applied to glass panels using a 3.0 mil Bird applicator. The panels were tested for drying rates in a 50% relative humidity, 72° F. room.

| Ex. No. | Paint Ex. No. | Equivalence Ratio of HMDA to AcAc Groups, % | Tack Free Time, hrs | Dry Through Time, hrs |
|---|---|---|---|---|
| 31 | 27 | 25 | 4 | 4 |
| 32 | 28 | 50 | 4 | 4 |

-continued

| Ex. No. | Paint Ex. No. | Equivalence Ratio of HMDA to AcAc Groups, % | Tack Free Time, hrs | Dry Through Time, hrs |
|---|---|---|---|---|
| 33 | 29 | 75 | 1½ | 2 |
| 34 | 30 | 100 | 1 | 2 |

35. Preparation of Acetoacetate-Functional Alkyd Resin 4

To a 1 L four-neck reaction flask equipped with a mechanical stirrer, a stream-jacketed partial condenser, a Dean-Stark trap, a water condenser, and a nitrogen spurge were charged trimethylolpropane (TMP) (148.2 g, 1.10 mole), the NPG/SIP adduct of Example 1 (87.4 g), isophthalic acid (193.1 g, 1.16 mole), Pamolyn 200 linoleic acid (222.3 g, 0.79 mole), and Fastcat 4100 catalyst (0.8 g). The reaction mixture was stirred at 150° C. for 1 hr, and then at 190° C. for 1 hr; the distillate was collected in the Dean-Stark trap. The reaction was allowed to continue at 210° C. for 1.5 hrs., and at 230° C. for 1.5 hrs.; a total of 40.3 g of distillate was collected. The acid number of the reaction mixture was 9.0 mg KOH/g and the hydroxyl number was 68.7 mg KOH/g of sample (1.23 mmol of hydroxyl per gram of polymer). The mixture was allowed to cool to 140° C. While at 140° C., D-65 defoamer (0.3 g) was added and T-butyl acetoacetate (118.5 g, 0.75 mole, 1.23 mmol per gram of polymer) was added to the reaction mixture via an addition funnel over a 30 min. period; a total of 55.0 g of distillate were collected in the Dean-Stark trap. The reaction was allowed to continue at 140° C., for 1.5 hrs. Propylene glycol monopropyl ether (200.0 g) was added to the reaction mixture slowly via an addition funnel and stirred into the mixture. The resulting mixture was allowed to cool to 100° C. and the resulting resin was collected for later testing.

36. Preparation of Acetoacetate-Functional Alkyd Resin 5

To a 1 L four-neck reaction flask equipped with a mechanical stirrer, a steam-jacketed partial condenser, a Dean-Stark trap, a water condenser, and a nitrogen spurge were charged trimethylolpropane (TMP) (148.2 g, 1.10 mole), the NPG/SIP adduct of Example 1 (87.4 g), isophthalic acid (193.1 g, 1.16 mole), Pamolyn 200 linoleic acid (222.3 g, 0.79 mole), and Fastcat 4100 catalyst (0.8 g). The reaction mixture was stirred at 150° C. for 1 hr, and then at 190° C. for 1 hr; the distillate was collected in the Dean-Stark trap. The reaction was allowed to continue at 210° C. for 1.5 hrs., and at 230° C. for 1.5 hrs.; a total of 38.6 g of distillate was collected. The acid number of the reaction mixture was 8.8 mg KOH/g and the hydroxyl number was 71.2 mg KOH/g of sample (1.27 mmol of hydroxyl per gram of polymer). The mixture was allowed to cool to 140° C. While at 140° C., D-65 defoamer (0.3 g) was added and T-butyl acetoacetate (79.0 g, 0.50 mole, 0.82 mmol per gram of polymer) was added to the reaction mixture via an addition funnel over a 30 min. period; a total of 43.0 g of distillate were collected in the Dean-Stark trap. The reaction was allowed to continue at 140° C. for 1.5 hrs. Propylene glycol monopropyl ether (200.0 g) was added to the reaction mixture slowly via an addition funnel and stirred into the mixture. The resulting mixture was allowed to cool to 100° C. and the resulting resin was collected for later testing.

37–38. Preparation of Acetoacetate-Functional Alkyd Paints 11 and 12

Samples of acetoacetate-functional alkyd resins 4 and 5 (Examples 35 and 36) were diluted with water and low levels of ammonium hydroxide (28%) according to the following table with the pH being adjusted to between 8.5 and 9.0. The level of hexamethylene diamine (HMDA, 25% in water) was calculated, but was not added to the paint until the last step. Based on the grams of alkyd used in the paint formulation, the moles of acetoacetate functionality were determined. The amount of HMDA to add to the paint was then calculated such that two moles of acetoacetate functionality could react with one mole of HMDA. The diluted mixtures were used in generating white paints based on the formulation listed in Examples 9–11.

| Ex. No. | Alkyd Ex. No. | Alkyd Solids, % | AcAc, mmol/g alkyd | Alkyd, grams | $H_2O$ & $NH_4OH$, grams | HMDA (25%), grams |
|---|---|---|---|---|---|---|
| 37 | 35 | 73.3 | 0.86 | 348.0 | 309.5 | 69.3 |
| 38 | 36 | 73.6 | 0.59 | 346.6 | 332.7 | 47.5 |

39–40. Drying Rates of Reactive Paints With Varying Levels of Acetoacetate Functionalities Reactive (inventive) paints from Examples 37 and 38 were applied to glass panels using a 3.0 mil Bird applicator. The panels were tested for drying rates in a 50% relative humidity, 72° F. room.

| Ex. No. | Paint Ex. No. | Paint Solids, % | Tack Free Time, hrs | Dry Through Time, hrs |
|---|---|---|---|---|
| 39 | 37 | 54.2 | ½ | 3 |
| 40 | 38 | 50.6 | 3 | 5 |

41–42. Evaluation of Reactive Paints With Varying Levels of Acetoacetate Functionalities Reactive paints from Examples 37 and 38 were applied to glass plates and metal panels (chromate pre-treated aluminum) using a 3.0 mil Bird applicator. The plates and panels were allowed to dry at room temperature for 24 hours prior to testing.

| Ex. No. | Paint Ex. No. | Paint Solids, % | Dry Film, mil | Gloss, 60° | Double Rubs, acetone | Hardness, Sward |
|---|---|---|---|---|---|---|
| 41 | 37 | 54.2 | 1.32 | 13.6 | 21 | 2.0 |
| 42 | 38 | 50.6 | 1.26 | 8.5 | 36 | 3.0 |

After 1 week at room temperature, the panels were again tested.

| Ex. No. | Paint Ex. No. | Gloss, 60° | Double Rubs, acetone | Hardness, Sward | Pencil Hardness |
|---|---|---|---|---|---|
| 41 | 37 | 12.9 | 81 | 4.0 | H |
| 42 | 38 | 8.5 | 32 | 4.0 | H |

43–45. Preparation of Acetoacetate-Functional Alkyd Paints 13 Through 15

Samples of acetoacetate-functional alkyd resin 2 (Example 3) were diluted with water (258.5 g of alkyd with 180.2 g of water). In Paint 13 (Example 43), the pH of the diluted alkyd dispersion was adjusted prior to paint preparation with ammonium hydroxide to a pH of 8.8. In Paint 14 (Example 44), the pH of the final paint was adjusted with ammonium hydroxide to a pH of 10.2. In Paint 15 (Example 45), the pH of the final paint was adjusted using the cycloaliphatic secondary amine morpholine to a pH of 9.0. In all cases, the pH adjustments consisted of equal total weights of ammonium hydroxide or amine and additional water in order to maintain equivalent paint solids. The level of hexamethylene diamine (HMDA, 25% in water) was calculated, but was not added to the paint until the last step. Based on the grams of alkyd used in the paint formulation, the moles of acetoacetate functionality were determined. The amount of HMDA to add to the paint was then calculated such that two moles of acetoacetate functionality could react with one mole of HMDA. Thus, white paints were generated using the following recipe.

| Ex. No. | pH Adjustment Point | pH Adjustment Component | H₂O & Amine or NH₄OH, grams | Adjustment pH |
|---|---|---|---|---|
| 43 | Dispersion | Ammonium Hydroxide | 39.3 | 8.8 |
| 44 | Paint | Ammonium Hydroxide | 39.3 | 10.2 |
| 45 | Paint | Morpholine | 39.3 | 9.0 |

| Ex. No. | Alkyd Ex. No. | HMDA (25%), g | Final pH of Paint | Paint Solids, % |
|---|---|---|---|---|
| 43 | 3 | 67.0 | 7.8 | 49.3 |
| 44 | 3 | 67.0 | 8.4 | 53.4 |
| 45 | 3 | 67.0 | 9.1 | 51.6 |

In a 1.0 L Cowles disperser was charged the diluted acetoacetate-functional resin 2 (136.2 g). For Paint 13 (Example 43), a total of 39.3 g of ammonium hydroxide (28%) and water were added to the dispersion to adjust the pH of the dispersion as noted in the table. The pH of Paints 14 and 15 were not adjusted at this point. To all the paints, BYK-156 dispersant (3.8 g), and BYK-024 defoamer (1.4 g) were added. The mixture was stirred under mild shear. Then under agitation, TiPure R-900 titanium oxide (191.3 g) was added slowly. The millbase was ground to a 7+ Hegman grind and reduced with additional diluted acetoacetate-functional alkyd resin (54.5 g). The paste was letdown with the addition of the diluted acetoacetate-functional alkyd resin (248.0 g) and a premixed solution of ethylene glycol butyl ether coalescent (23.0 g), Hydrocure II 5% cobalt catalyst (3.8 g), Hydro Cem 12% zirconium catalyst (7.7 g) and BYK-024 defoamer (2.7 g). The pH of Paint 14 (Example 44) was adjusted as noted in the table by inclusion of 39.3 g of ammonium hydroxide and water. The pH of Paint 15 (Example 45) was adjusted as noted in the table by inclusion of 39.9 g of morpholine and water. The quantity of 25% hexamethylene diamine listed in the above table was added to the paints and the paints were mixed. The paints were then used for testing.

46–48. Drying Rates of Reactive Paints With Varying Methods of pH Adjustments Reactive paints from Examples 43 through 45 were applied to glass panels using a 3.0 mil Bird applicator. The panels were tested for drying rates in a 50% relative humidity, 72° F. room.

| Ex. No. | Paint Ex. No. | Paint Solids, % | Tack Free Time, hrs | Dry Through Time, hrs |
|---|---|---|---|---|
| 46 | 43 | 49.3 | ¾ | ¾ |
| 47 | 44 | 53.4 | 3 | 3 |
| 48 | 45 | 51.6 | ¾ | ¾ |

49–51. Evaluation of Reactive Paints With Varying Methods of pH Adjustments

Reactive (inventive) paints from Examples 43 through 45 were applied to glass plates and metal panels (chromate pre-treated aluminum) using a 3.0 mil Bird applicator. The plates and panels were allowed to dry at room temperature for 24 hours prior to testing.

| Ex. No. | Paint Ex. No. | Paint Solids, % | Dry Film, mil | Gloss, 60° | Double Rubs, acetone | Hardness, Sward |
|---|---|---|---|---|---|---|
| 49 | 43 | 49.3 | .57 | 5.2 | 34 | 2.0 |
| 50 | 44 | 53.4 | .72 | 4.4 | 41 | 2.0 |
| 51 | 45 | 51.6 | .67 | 6.5 | 57 | 2.5 |

After 1 week at room temperature, the panels were again tested.

| Ex. No. | Paint Ex. No. | Gloss, 60° | Double Rubs, acetone | Hardness, Sward | Pencil Hardness |
|---|---|---|---|---|---|
| 49 | 43 | 4.4 | 135 | 5.0 | H |
| 50 | 44 | 4.1 | 130 | 4.5 | H |
| 51 | 45 | 6.1 | 165 | 5.5 | H |

We claim:
1. An aqueous coating composition, comprising:
   a water-dispersible alkyd having sulfonate functionality and acetoacetate functionality;
   a monofunctional primary or a monofunctional cycloaliphatic secondary amine;
   a polyfunctional amine having at least two primary amine functionalities; and
   water.
2. The aqueous coating composition according to claim 1, wherein the monofunctional primary or monofunctional cylcoaliphatic secondary amine includes at least one member selected from the group consisting of ammonia, methyl amine, ethyl amine, isopropyl amine, n-propyl amine, n-butyl amine, sec-butyl amine, t-butyl amine, morpholine, piperidine, 3-methyl piperidine; pyrrolidine, and mixtures thereof.
3. The aqueous coating composition according to claim 1, wherein the monofunctional primary or monofunctional cylcoaliphatic secondary amine includes ammonia or ammonium hydroxide.
4. The aqueous coating composition according to claim 1, wherein the polyfunctional amine having at least two primary amine functionalities includes at least one member selected from the group consisting of hexamethylene diamine (HMDA); 2-methyl pentamethylene diamine; 1,3-diamino pentane; dodecane diamine; 1,2-diamino cyclohexane; 1,4-diamino cyclohexane; para-phenylene diamine; isophorone diamine; bis-hexamethylene trimine; diethylene triamine (DETA); polyethylenimine; a polyamine adduct of ethylene oxide; a polyamine adduct of propylene oxide; and mixtures thereof.

5. The aqueous coating composition according to claim 1, wherein the polyfunctional amine having at least two primary amine functionalities includes hexamethylene diamine.

6. The aqueous coating composition according to claim 1, wherein the composition further includes at least one drier.

7. The aqueous coating composition according to claim 6, wherein the at least one drier includes a salt of cobalt, zirconium, calcium, manganese, lead, iron, zinc, cerium, vanadium, barium, or aluminum.

8. The aqueous coating composition according to claim 6, wherein the at least one drier is an octoate or a naphthenate.

9. The aqueous coating composition according to claim 6, wherein the drier is present in an amount of from 0.005–0.5 wt. % metal, based on the alkyd resin.

10. A method of making an aqueous coating composition, comprising:
   reacting a glycol or a polyol with a sulfonate-functional dicarboxylic acid to obtain a sulfonate-functional adduct;
   reacting the sulfonate-functional adduct, to obtain a sulfonate-functional alkyd, with:
      a monobasic fatty acid, a fatty ester, or a naturally occurring, partially-saponified oil,
      optionally, a glycol or a polyol, and
      optionally, a polycarboxylic acid;
   reacting the sulfonate-functional alkyd, to obtain an alkyd having sulfonate functionality and acetoacetate functionality, with a member selected from the group consisting of: diketene; 2,2,6-trimethyl-4H-1,3-dioxin-4-one; methyl acetoacetate; ethyl acetoacetate; isobutyl acetoacetate; isopropyl acetoacetate; diisopropyl carbinol acetoacetate; t-amyl acetoacetate; and t-butyl acetoacetate;
   dispersing the alkyd having sulfonate functionality and acetoacetate functionality in water;
   reacting the dispersed alkyd having sulfonate functionality and acetoacetate functionality with a monofunctional primary or a monofunctional cycloaliphatic secondary amine to obtain an alkyd having enamine functionality; and
   mixing the alkyd having enamine functionality with a polyfunctional amine having at least two primary amine functionalities to obtain the aqueous coating composition.

11. The method according to claim 10, wherein the sulfonate-functional dicarboxylic acid is a member selected from the group consisting of 5-sodiosulfoisophthalic acid, dimethyl 5-sodiosulfoisophthalate, lithium 5-sulfoisophthalic acid, dimethyl lithium 5-sulfoisophthalate, potassium 5-sulfoisophthalic acid, and dimethyl potassium 5-sulfoisophthalate.

12. The method according to claim 10, wherein the sulfonate-functional alkyd is reacted with t-butyl acetoacetate to obtain the alkyd having sulfonate functionality and acetoacetate functionality.

13. The method according to claim 10, wherein the monofunctional primary or monofunctional cylcoaliphatic secondary amine includes at least one member selected from the group consisting of ammonia, methyl amine, ethyl amine, isopropyl amine, n-propyl amine, n-butyl amine, sec-butyl amine, t-butyl amine, morpholine, piperidine, 3-methyl piperidine; pyrrolidine, and mixtures thereof.

14. The method according to claim 10, wherein the polyfunctional amine having at least two primary amine functionalities includes at least one member selected from the group consisting of hexamethylene diamine (HMDA); 2-methyl pentamethylene diamine; 1,3-diamino pentane; dodecane diamine; 1,2-diamino cyclohexane; 1,4-diamino cyclohexane; para-phenylene diamine; isophorone diamine; bis-hexamethylene trimine; diethylene triamine (DETA); polyethylenimine; a polyamine adduct of ethylene oxide; a polyamine adduct of propylene oxide; and mixtures thereof.

15. The method according to claim 10, wherein the polyfunctional amine having at least two primary amine functionalities comprises hexamethylene diamine.

16. The method according to claim 10, wherein the monofunctional primary or monofunctional cylcoaliphatic secondary amine comprises morpholine.

17. The method according to claim 10, wherein hydroxyl groups of the sulfonate-functional alkyd are transesterified with at least one member selected from the group consisting of methyl acetoacetate, ethyl acetoacetate, isobutyl acetoacetate, isopropyl acetoacetate, disopropyl carbinol acetoacetate, t-amyl acetoacetate, and t-butyl acetoacetate.

18. The method according to claim 10, wherein the sulfonate-functional alkyd is reacted with diketene or 2,2,6-trimethyl-4H-1,3-dioxin-4-one.

* * * * *